United States Patent
Cheng et al.

(10) Patent No.: US 10,526,094 B2
(45) Date of Patent: Jan. 7, 2020

(54) PLATFORM

(71) Applicant: Coretronic Intelligent Robotics Corporation, Hsinchu County (TW)

(72) Inventors: Hsu-Chih Cheng, Hsin-Chu (TW); Ying-Chieh Chen, Hsin-Chu (TW); Chi-Tong Hsieh, Hsin-Chu (TW)

(73) Assignee: Coretronic Intelligent Robotics Corporation, Hsinchu County (TW)

( * ) Notice: Subject to any disclaimer, the term of this patent is extended or adjusted under 35 U.S.C. 154(b) by 274 days.

(21) Appl. No.: 15/721,003

(22) Filed: Sep. 29, 2017

(65) Prior Publication Data
US 2019/0100330 A1    Apr. 4, 2019

(51) Int. Cl.
*B64C 39/02*    (2006.01)
*B64F 1/00*    (2006.01)

(52) U.S. Cl.
CPC ............ *B64F 1/007* (2013.01); *B64C 39/024* (2013.01); *B64C 2201/066* (2013.01)

(58) Field of Classification Search
CPC .. B64C 2201/066; B64C 39/024; B64F 1/007
See application file for complete search history.

(56) References Cited

U.S. PATENT DOCUMENTS

| | | | |
|---|---|---|---|
| 8,511,606 B1 * | 8/2013 | Lutke | B64C 39/028 244/100 R |
| 9,764,836 B1 * | 9/2017 | Elzinga | B64C 39/024 |
| 10,099,561 B1 * | 10/2018 | Ananthanarayanan | B64C 39/024 |
| 10,303,171 B1 * | 5/2019 | Brady | G05D 1/0088 |
| 10,315,528 B1 * | 6/2019 | Crawford, Jr. | B60L 53/30 |
| 10,369,975 B2 * | 8/2019 | Wang | B60S 5/06 |
| 2016/0009413 A1 * | 1/2016 | Lee | B64F 1/007 701/16 |
| 2016/0039540 A1 * | 2/2016 | Wang | B64F 1/36 244/114 R |
| 2016/0311329 A1 * | 10/2016 | Rodriguez | B60L 11/182 |
| 2016/0364989 A1 * | 12/2016 | Speasl | G08G 5/0034 |
| 2017/0050749 A1 * | 2/2017 | Pilskalns | B64F 1/362 |
| 2017/0096075 A1 * | 4/2017 | Henry | B60L 11/1822 |
| 2017/0158353 A1 * | 6/2017 | Schmick | B64F 1/007 |

(Continued)

FOREIGN PATENT DOCUMENTS

CN    104102248 A    10/2014
CN    106542109 A    3/2017
(Continued)

*Primary Examiner* — Claude J Brown

(57) ABSTRACT

A platform, adapted to accommodate a UAV (Unmanned Aerial Vehicle), includes a base and a cover. The base includes a first connection port and a power source, and the power source is coupled to the first connection port including a first connection electrode and a second connection electrode. The cover includes at least one fan and a second connection port corresponding to the first connection port of the base, the at least one fan is coupled to the second connection port, and the second connection port includes a first contact electrode and a second contact electrode. The cover is connected to the base and moves between an open position and a closed position relative to the base. The first connection port is connected to the second connection port when the cover is at the closed position, and the power source provides power to the at least one fan.

12 Claims, 9 Drawing Sheets

(56) References Cited

U.S. PATENT DOCUMENTS

| | | | |
|---|---|---|---|
| 2017/0183106 A1* | 6/2017 | Yu | B64F 1/025 |
| 2017/0327091 A1* | 11/2017 | Capizzo | B60L 53/60 |
| 2018/0029723 A1* | 2/2018 | Krauss | B64F 1/00 |
| 2018/0039286 A1* | 2/2018 | Tirpak | G05D 1/0676 |
| 2018/0118374 A1* | 5/2018 | Lombardini | B60L 9/00 |
| 2018/0141680 A1* | 5/2018 | Heinonen | B64F 1/12 |
| 2018/0148170 A1* | 5/2018 | Stamatovski | B64F 1/007 |
| 2018/0170191 A1* | 6/2018 | Xing | B60L 53/00 |
| 2018/0178665 A1* | 6/2018 | Chen | H02J 7/0044 |
| 2018/0212446 A1* | 7/2018 | Cheng | H02J 7/0044 |
| 2018/0245365 A1* | 8/2018 | Wankewycz | B64C 39/024 |
| 2018/0257502 A1* | 9/2018 | Park | H02J 50/80 |
| 2018/0290764 A1* | 10/2018 | McMillian | B64D 45/04 |
| 2018/0327091 A1* | 11/2018 | Burks | B64C 39/024 |
| 2018/0354649 A1* | 12/2018 | Ortiz | B64F 1/007 |
| 2019/0002127 A1* | 1/2019 | Straus | B64F 1/222 |
| 2019/0002128 A1* | 1/2019 | Raz | B64F 1/12 |
| 2019/0023133 A1* | 1/2019 | Renold | B60L 11/182 |
| 2019/0100331 A1* | 4/2019 | Wright | B64F 1/02 |

FOREIGN PATENT DOCUMENTS

| | | |
|---|---|---|
| CN | 206031812 U | 3/2017 |
| CN | 107355983 A | 11/2017 |
| CN | 206713239 U | 12/2017 |
| WO | 2017109780 A1 | 6/2017 |

\* cited by examiner

PLATFORM

FIELD OF THE INVENTION

The invention relates to a platform, and more particularly to a platform adapted to accommodate a UAV (Unmanned Aerial Vehicle).

BACKGROUND OF THE INVENTION

The UAV (Unmanned Aerial Vehicle) may be used to perform a variety of aerial functions in outdoor or indoor environments, such as surveillance and observation. The UAV can be remotely piloted by a pilot or can be autonomous or semi-autonomous vehicles that fly missions using preprogrammed coordinates, GPS navigation, etc. The UAV may be equipped with cameras to provide imagery during flight, which may be used for navigation or other purposes. The UAV can also be equipped with sensors to provide local weather and atmospheric conditions, radiation levels, and other conditions, and the UAV may also include cargo bays, hooks, or other means for carrying payloads.

Furthermore, the UAV may be electrically powered and may require a charging mechanism to charge the batteries and power systems of the UAV. Accordingly, a platform is desired to provide a docking, protection and a charging location for the UAV.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide a platform for accommodating a UAV.

Other objectives and advantages of the invention may be further illustrated by the technical features disclosed in the invention.

In order to achieve one or a portion of or all of the objectives or other objectives, an embodiment of the invention provides a platform, adapted to accommodate a UAV (Unmanned Aerial Vehicle), including a base and a cover. The base includes a first connection port and a power source, the power source is coupled to the first connection port, and the first connection port includes a first connection electrode and a second connection electrode. The cover includes at least one fan and a second connection port corresponding to the first connection port of the base, the at least one fan is coupled to the second connection port, and the second connection port includes a first contact electrode and a second contact electrode. The cover is connected to the base and moves between an open position and a closed position relative to the base, when the cover is at the closed position, the cover covers the base. The first connection port is connected to the second connection port when the cover is at the closed position, the first connection electrode is electrically connected to the first contact electrode, the second connection electrode is electrically connected to the second contact electrode, and the power source provides power to the at least one fan. The first connection port is not connected to the second connection port when the cover is at the open position.

In the platform of the invention, the fan of the cover and the power source of the base do not need the wire to connect, may save the cost of using the cable chains and improve the convenience of the assembly. Also, the moving distance of the cover at the open position will not be limited by the cable chain or wire, and when the cover is at the open position, the power of the fan will automatically turn off to save power without the need for additional software control.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
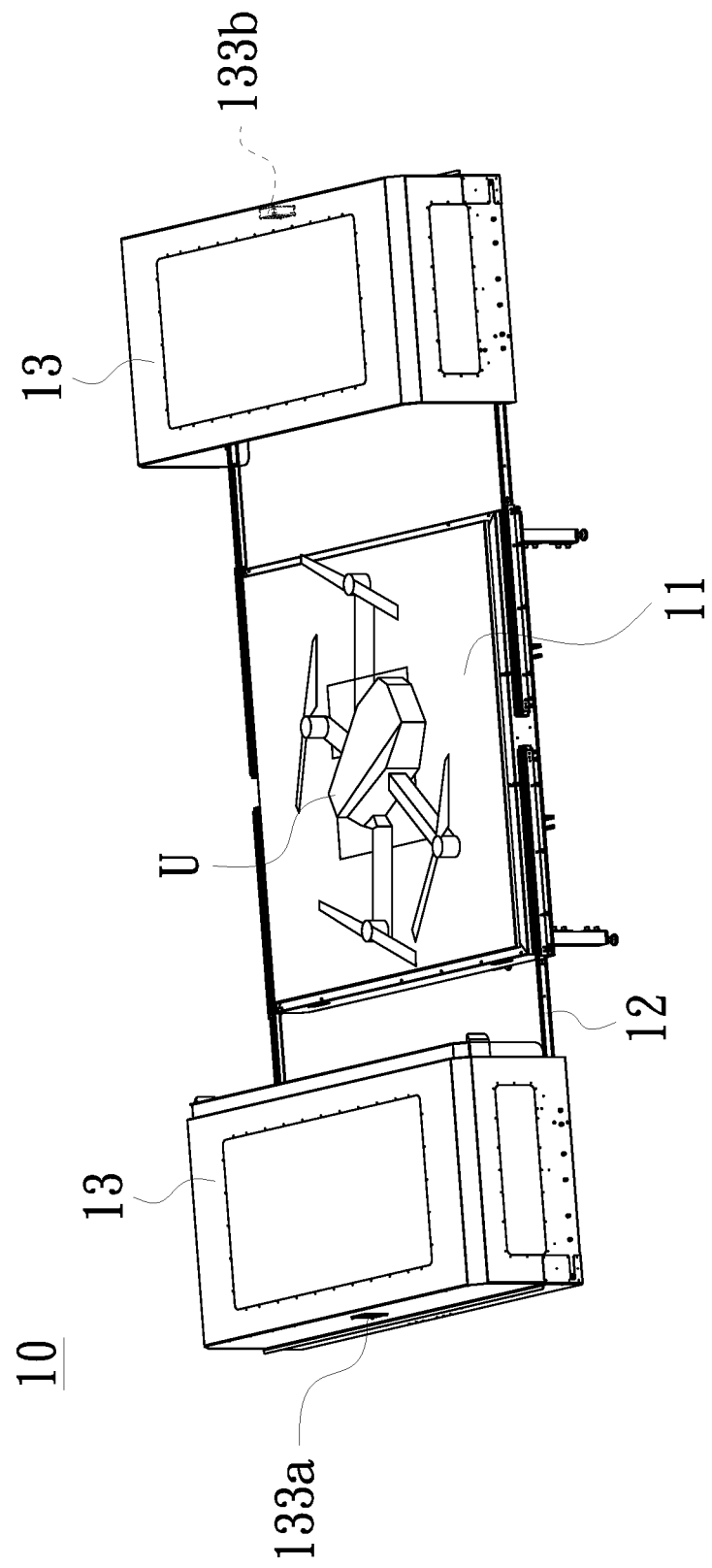
FIG. 1 shows a schematic diagram of a platform according to an embodiment of the invention.

Referring to FIG. 1, which is a schematic diagram of a platform according to an embodiment of the invention. As shown in FIG. 1, the platform 10 includes a base 11 and a cover 13, the base 11 includes a driving device 12. The cover 13 includes fans 133a and 133b. The driving device 12 drives the cover 13 to move between an open position and a closed position relative to the base 11, wherein FIG. 1 shows the schematic diagram of the cover 13 at the open position. When the cover 13 is at the open position, the UAV U could land on the base 11, and when the cover 13 is at the closed position (shown in FIG. 3), the cover 13 could cover the base 11 and the base 11 can charge the UAV U, wherein the fans 133a and 133b can cool down the inside of the platform 10. In other embodiment, the fans 133a and 133b can cool down the UAV U inside of the platform 10 while charging.

Figure 2:
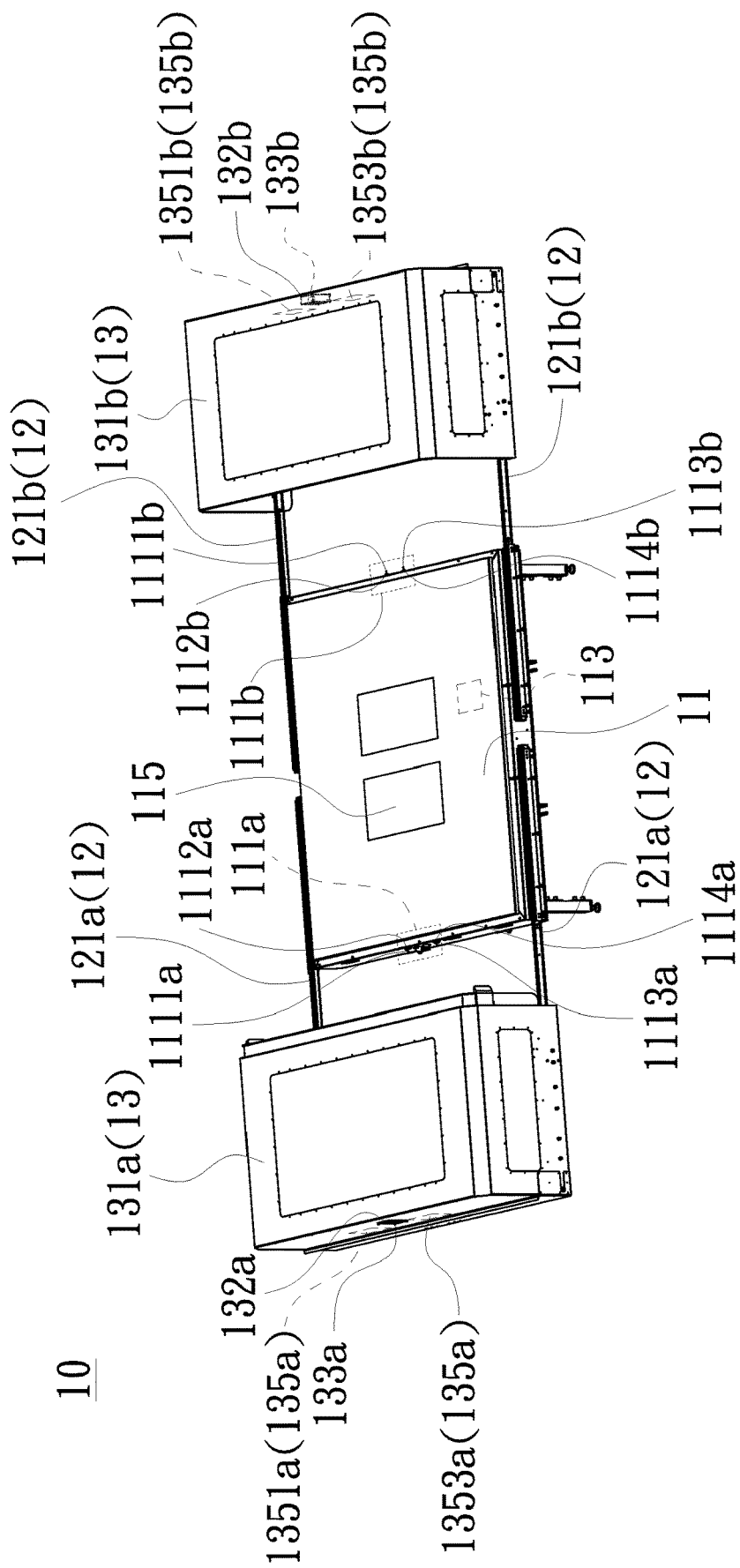
FIG. 2 shows a schematic diagram of a platform according to an embodiment of the invention.

Referring to FIG. 2, which is a schematic diagram of a platform according to an embodiment of the invention, wherein the cover 13 is at the open position. As shown in FIG. 2, the platform 10 includes a base 11 and a cover 13. The base 11 includes a first connection port 111a and 111b and a power source 113, and the power source 113 is coupled to the first connection port 111a and 111b. The first connection port 111a includes a first connection electrode 1111a and a second connection electrode 1113a, and the first connection port 111b includes a first connection electrode 1111b and a second connection electrode 1113b. The cover 13 includes fan 133a, fan 133b, and second connection ports 135a and 135b corresponding to the first connection ports 111a and 111b of the base 11, the fans 133a and 133b are coupled to the second connection ports 135a and 135b respectively, the second connection port 135a includes a first contact electrode 1351a and a second contact electrode 1353a, and the second connection port 135b includes a first contact electrode 1351b and a second contact electrode 1353b.

Figure 3:
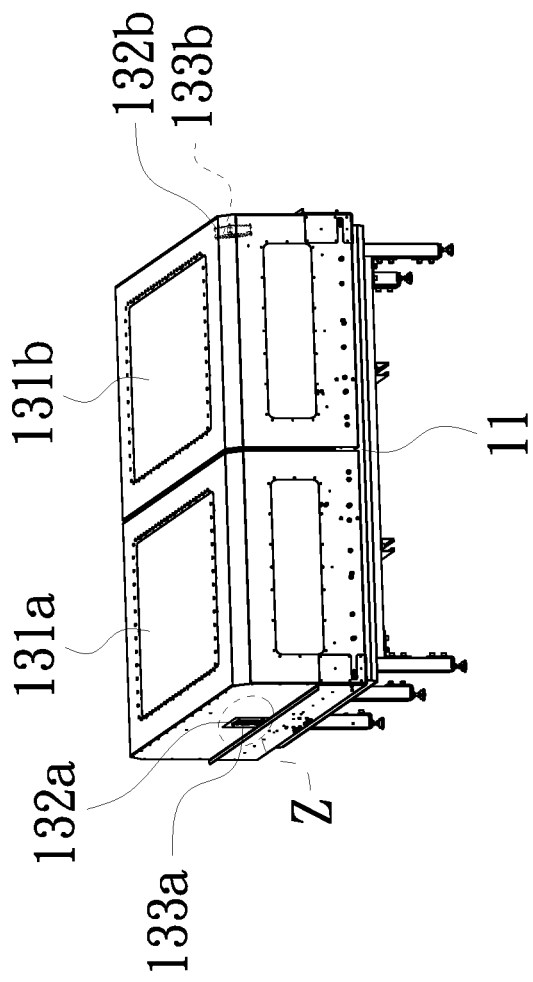
FIG. 3 shows a schematic diagram of a platform according to an embodiment of the invention.

The cover 13 is connected to the base 11 and moves between an open position and a closed position relative to the base 11. Referring to FIG. 2 and FIG. 3, FIG. 3 shows the schematic diagram of the cover 13 at the closed position. When the cover 13 is at the closed position, the cover 13 covers the base 11, and when the cover 13 is at the open position, the UAV (not shown in FIG. 2) could land on the base 11. The first connection ports 111a and 111b are connected to the second connection ports 135a and 135b respectively when the cover 13 is at the closed position, the first connection electrodes 1111a and 1111b are electrically connected to the first contact electrodes 1351a and 1351b, the second connection electrodes 1113a and 1113b are electrically connected to the second contact electrodes 1353a and 1353b, and the power source 13 provides power to the fans 133a and 133b, wherein the fans 133a and 133b can cool down the inside of the platform 10 while charging. The first connection ports 111a and 111b are not connected to the second connection ports 135a and 135b when the cover 13 is at the open position.

In addition, the base 11, for example, could further include a charging port 115. The charging port 115 is coupled to the power source 113, and the charging port 115 is adapted to electrically connect the UAV and charge the UAV. The power source 113, for example, could be the AC power supply or a battery, to which the invention is not limited.

Furthermore, the cover 13 could include a first sub-cover 131a and a second sub-cover 131b, and the first sub-cover 131a and the second sub-cover 131b are moving in opposite directions when the cover 13 is moving between the open position and the closed position. Moreover, the base 11 further includes a driving device 12, and the driving device 12 could drive the cover 13 to move between the open position and the closed position, wherein the driving device 12 may consist of driving rods 121a, 121b and motors (not shown in the figures) to achieve the purpose of driving the cover 13, to which the invention is not limited.

Figure 4:
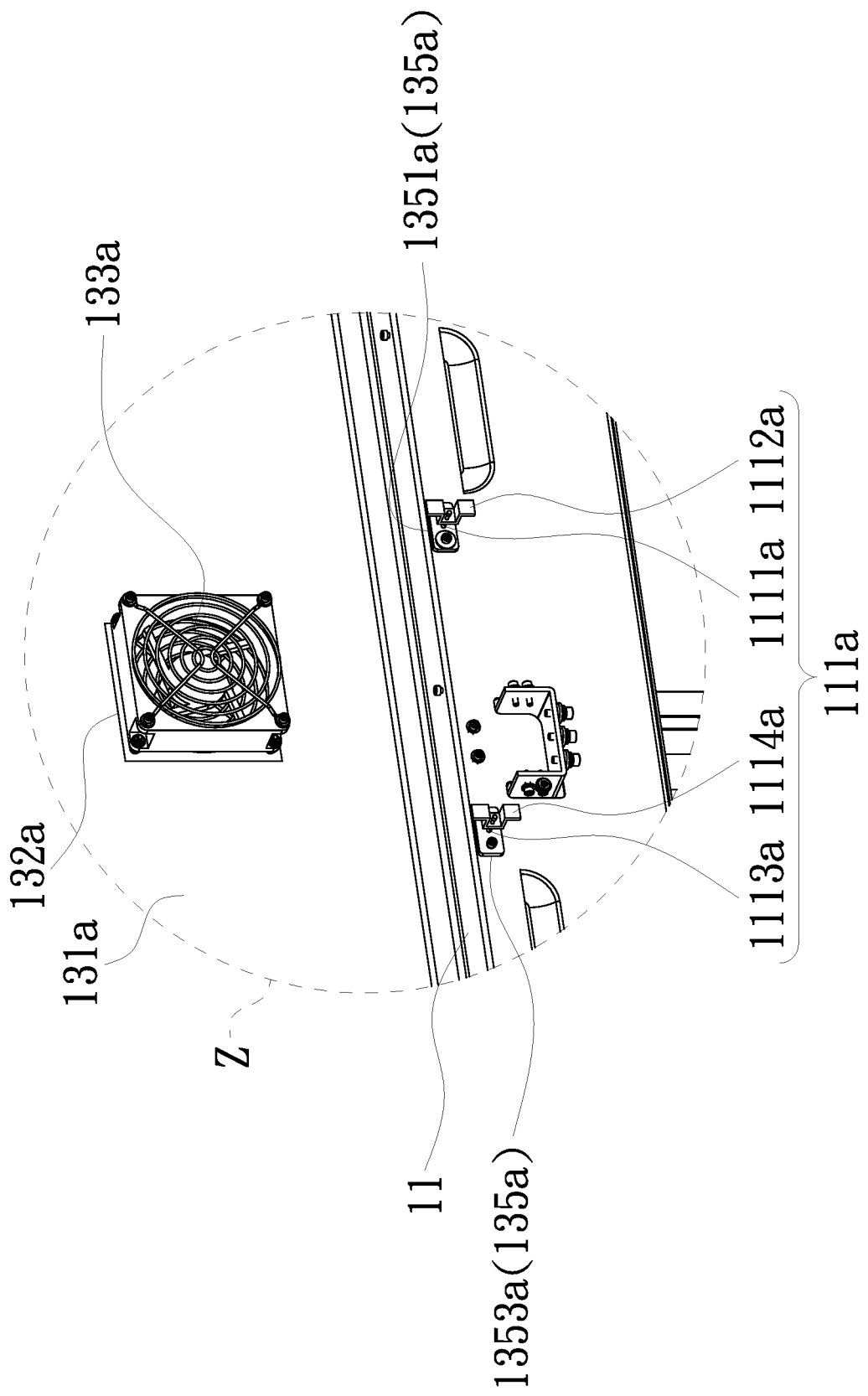
FIG. 4 shows an enlarged schematic perspective view of the area Z shown in FIG. 3.

Referring to FIG. 4, which is an enlarged schematic perspective view of the area Z shown in FIG. 3. The cover 13 further includes a first vent 132a and a second vent 132b, and the first vent 132a is disposed on the first sub-cover 131a, and the second vent 132b is disposed on the second sub-cover 131b. In this embodiment, the fan 133a is disposed on the first vent 132a, and the fan 133b is disposed on the second vent 132b, wherein the fan 133a, for example, could be a suction fan and the fan 133b, for example, could be an exhaust fan, to which the invention is not limited. Therefore, when the fans 133a and 133b are activated, the fan 133a can suck the air outside the platform 10, and the fan 133b can exhaust the air in the platform 10, to achieve the purpose of cooling. In other embodiment, the fan 133a and the fan 133b may be the axial fan or sirocco fan, to which the invention is not limited.

Furthermore, the first connection electrodes 1111a and 1111b could be disposed on fixed bases 1112a and 1112b of the base 11 respectively, and the second connection electrodes 1113a and 1113b could be disposed on fixed bases 1114a and 1114b of the base 11 respectively, to which the invention is not limited. In this embodiment, the first connection electrode 1111a and the second connection electrode 1113a are pogo pins, so that the first connection port 111a will be connected to the second connection port 135a when the cover 13 is at the closed position. In other embodiment, the first contact electrode 1351a and the second contact electrode 1353a are pogo pins, to which the invention is not limited.

Figure 5:
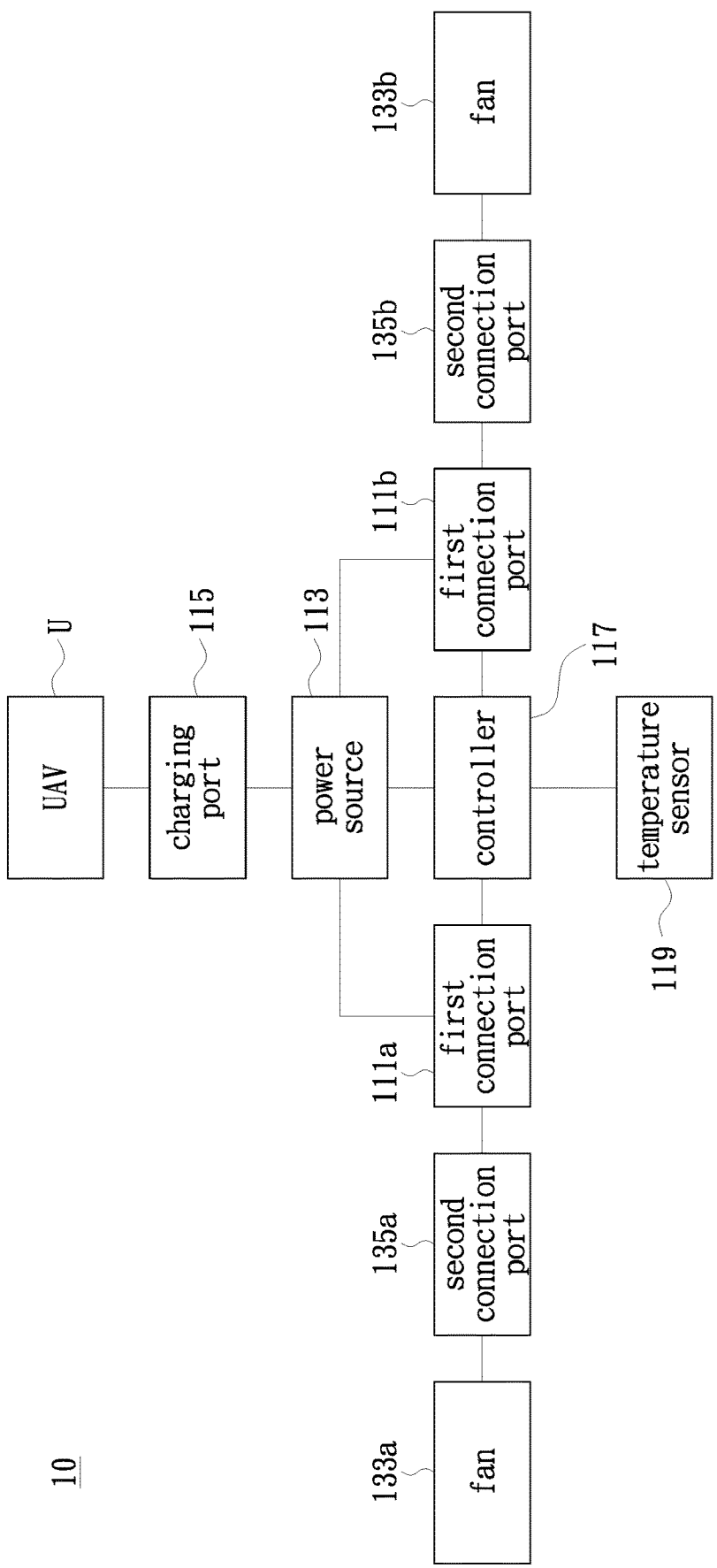
FIG. 5 is a block diagram of a platform according to an embodiment of the invention.

Referring to FIG. 5, which is a block diagram of the platform 10 shown in FIG. 2 and FIG. 3, wherein FIG. 5 shows the condition of the cover 13 at the closed position. The first connection ports 111a and 111b are connected to the second connection ports 135a and 135b respectively. In this embodiment, the base 11 could further include a controller 117 and a temperature sensor 119, and the controller 117 is coupled to the first connection ports 111a, 111b and the temperature sensor 119. When the cover 13 is at the closed position and the temperature sensor 119 detects a temperature greater than a preset value, the controller 117 activates the fans 133a and 133b to cool down the platform 10 through the power source 13 providing power to the fans 133a and 133b. The embodiment can prevent the battery temperature of the UAV from overheating when charging. The preset value is, for example, 50 degrees Celsius, to which the invention is not limited.

Furthermore, in other embodiment of the invention, the temperature sensor 119 is disposed on the cover 13, and when the cover 13 is at the closed position, the controller 117 is coupled to the temperature sensor 119 by the first connection ports 111a or 111b. That is, the temperature sensor 119 can be disposed anywhere on the platform 10, as long as the temperature sensor 119 can sense the internal temperature of the platform 10, wherein the temperature sensor 119 is, for example, a thermal coupler, to which the invention is not limited.

In other embodiment, the controller 117 controls the speed of fans 133a and 133b according to the temperature detected by the temperature sensor 119 to improve the efficiency of cooling. In addition, the base 11 or the cover 13 could include a micro switch (not shown in the figures) connected to the controller 117 to detect whether the cover 13 is at the open position or at the closed position. Furthermore, the base 11 may also include a communication device (not shown in the figures) that communicates with the UAV for the controller 117 to determine the timing of opening or closing the cover 13.

Figure 6:
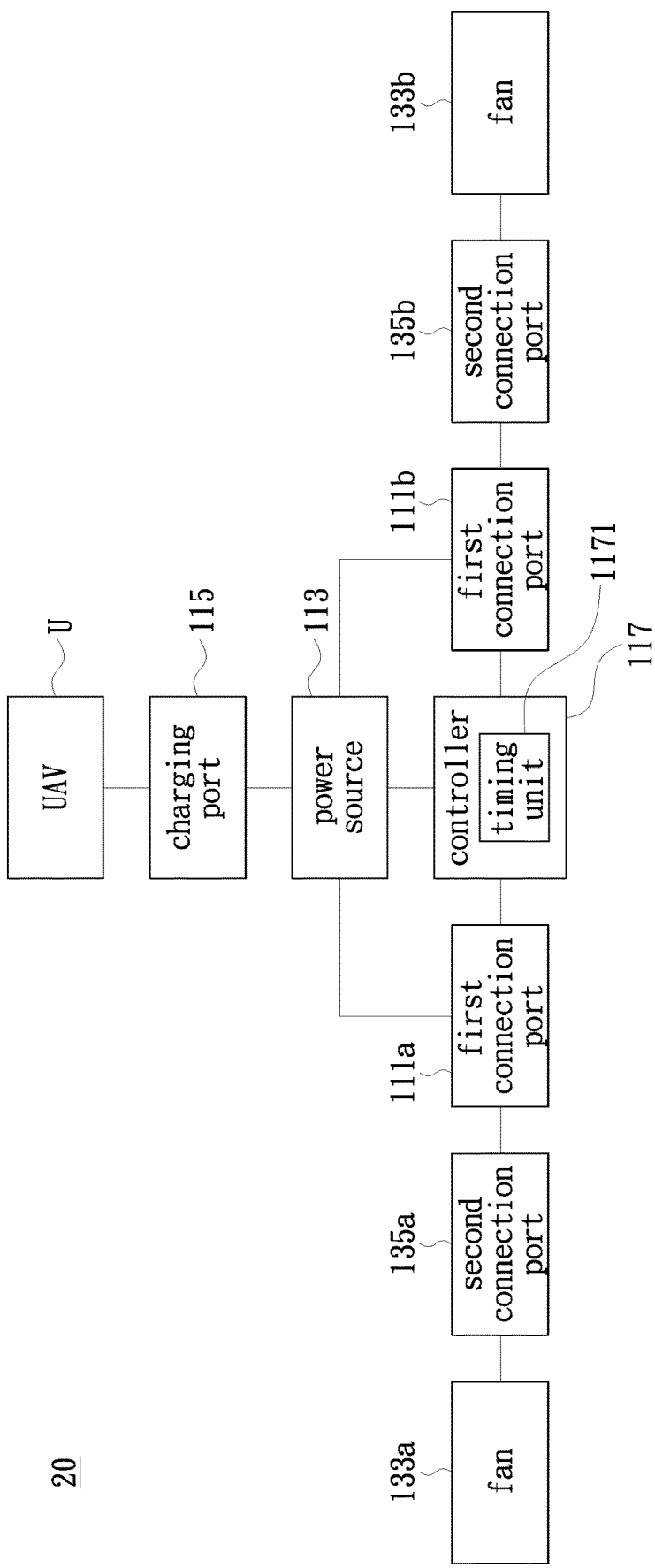
FIG. 6 is a block diagram of a platform according to another embodiment of the invention.

Referring to FIG. 6, which is a block diagram of a platform according to another embodiment of the invention, wherein FIG. 6 shows the condition of the cover 13 at the closed position. The embodiment is different from the embodiment in FIG. 2 and FIG. 3 in that the base 11 further includes a controller 117, the controller 117 includes a timing unit 1171, and the controller 117 is coupled to the first connection port 111a and 111b. When the cover 13 is at the closed position, the controller 117 will activate or deactivate the fans 133a and 133b according to preset time value of the timing unit 1171 to cool down the platform 20 through the power source 13 providing power to the fans 133a and 133b. The preset time value, for example, could be set by the user according to the weather or the UAV condition, to prevent the battery temperature of the UAV from overheating when charging. The preset time value, for example, could be stored in the memory of the timing unit 1171 of the controller 117.

Figure 7:
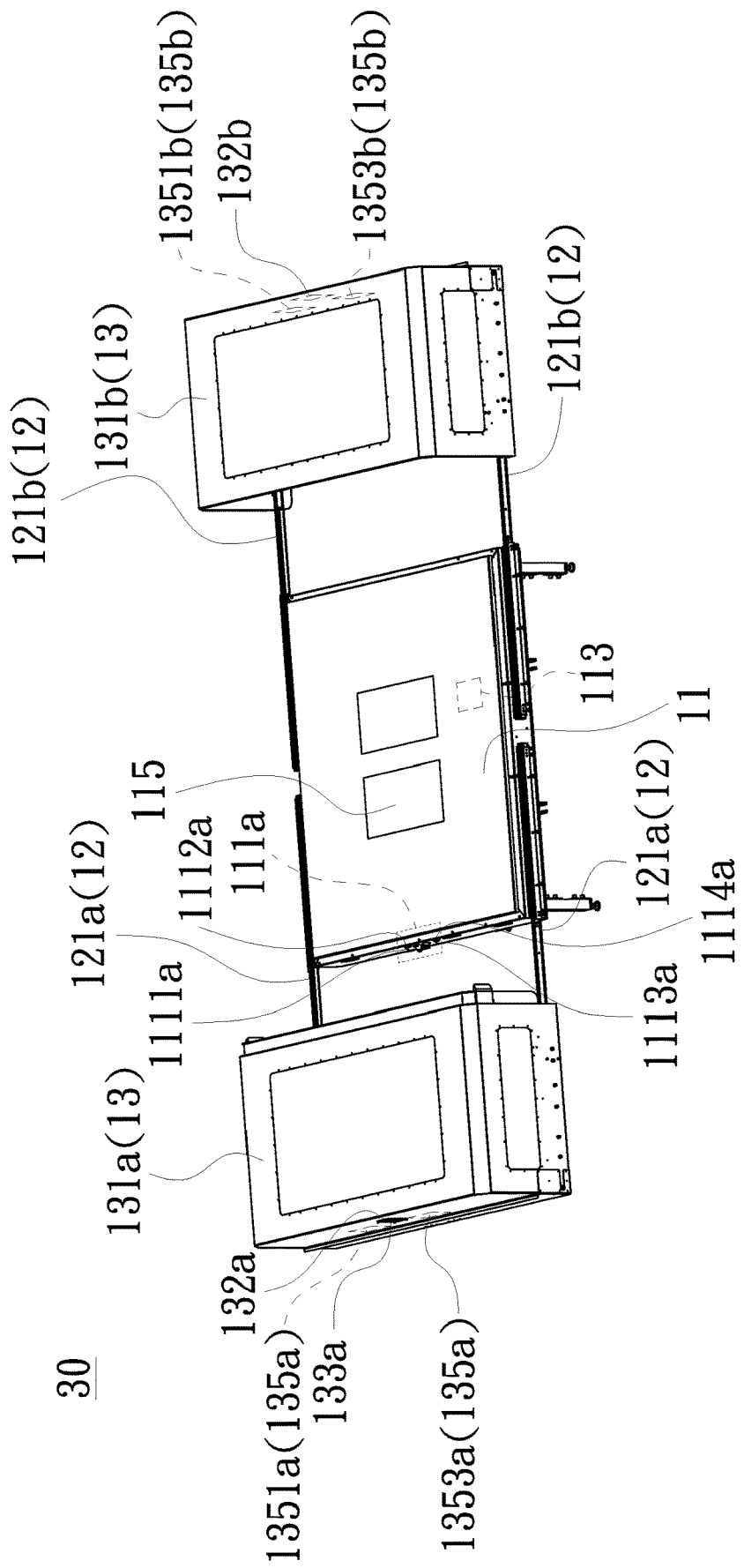
FIG. 7 shows a schematic diagram of a platform according to still another embodiment of the invention.

Referring to FIG. 7, which is a schematic diagram of a platform according to still another embodiment of the invention. The embodiment is different from the embodiment in FIG. 2 and FIG. 3 in that the cover 13 does not include the fan 133b, and the fan 133a, for example, could be a suction fan or an exhaust fan. When the fan 133a is activated, the fan 133a can suck the air outside or exhaust the air in the platform 30, and the second vent 132b will let the air flow, to achieve the purpose of cooling.

Figure 8:
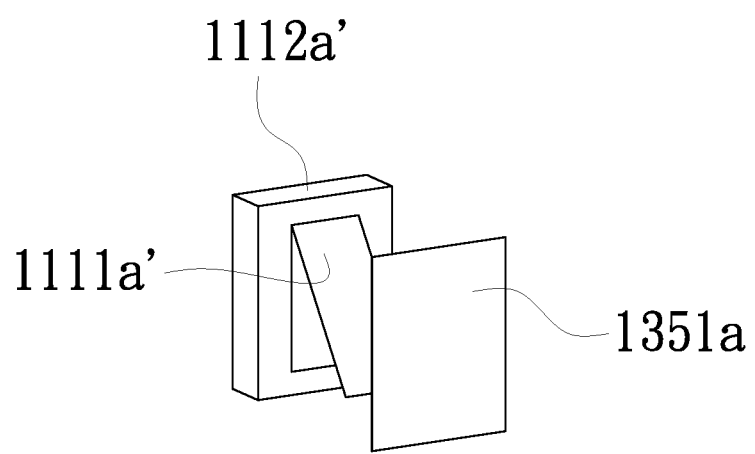
FIG. 8 shows a schematic diagram of the first connection electrode and the first contact electrode according to still another embodiment of the invention.

Referring to FIG. 8, which is a schematic diagram of the first connection electrode and the first contact electrode according to still another embodiment of the invention. The embodiment is different from the embodiment in FIG. 2 and FIG. 3 in that the first connection electrode 1111a' is a piece of spring, so that the first connection electrode 1111a' will be electrically connected to the first contact electrode 1351a when the cover 13 is at the closed position. The first connection electrode 1111a' could be disposed on a fixed base 1112a'. In other embodiment, the first contact electrode 1351a is a piece of spring, to which the invention is not limited. In other embodiment, one of the second connection electrode 1113a and the second contact electrode 1353a is a piece of spring (not shown in the figures).

Figure 9:
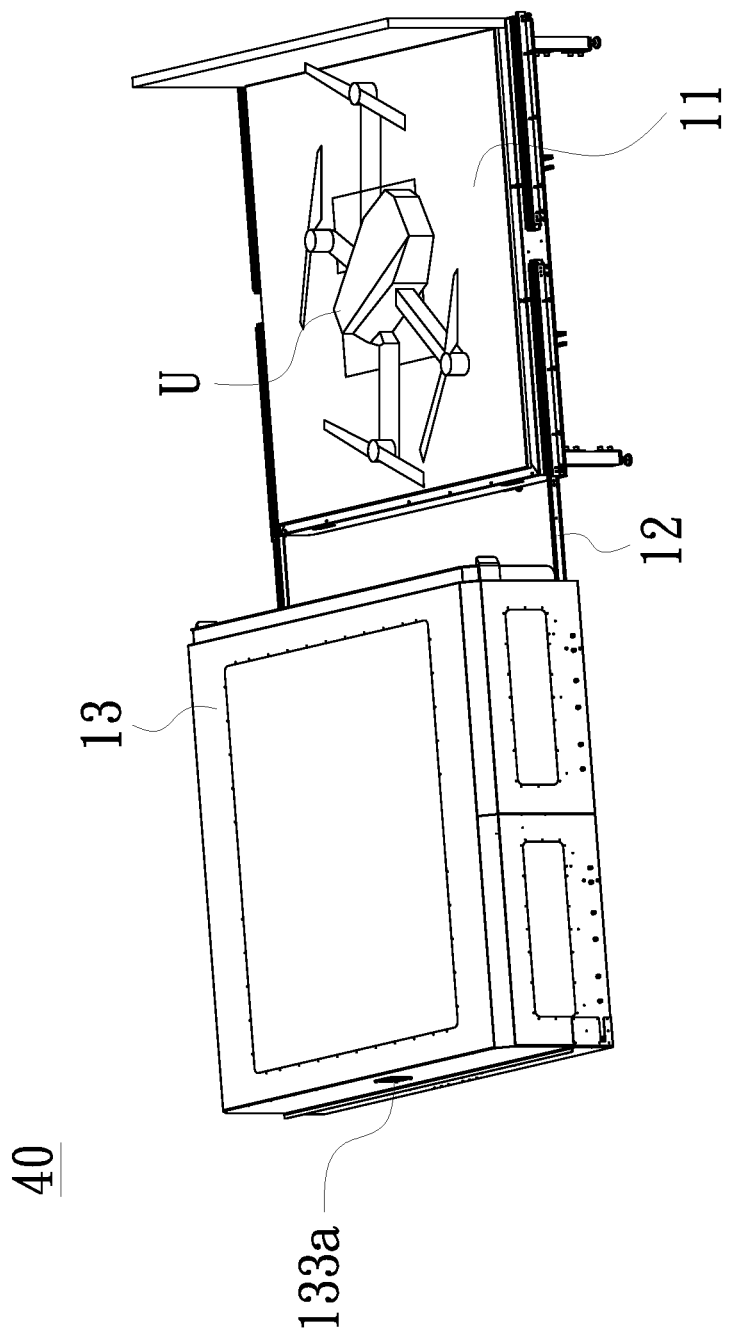
FIG. 9 shows a schematic diagram of a platform according to another embodiment of the invention.

Referring to FIG. 9, which is a schematic diagram of a platform according to an embodiment of the invention. As shown in FIG. 9, the platform 40 includes a base 11 and a cover 13, the base 11 includes a driving device 12. The cover 13 includes fans 133a. The driving device 12 drives the cover 13 to move between an open position and a closed position relative to the base 11, wherein FIG. 9 shows the schematic diagram of the cover 13 at the open position. When the cover 13 is at the open position, the UAV U could land on the base 11, and when the cover 13 is at the closed position, the cover 13 could cover the base 11 and the base 11 can charge the UAV U, wherein the fan 133a can cool down the inside of the platform 40.

In summary, the platforms of the embodiments of the invention have the following advantages. The fan of the cover and the power source of the base do not need the wire to connect, may save the cost of using the cable chains and improve the convenience of the assembly. Also, the moving distance of the cover at the open position will not be limited by the cable chain or wire. Besides, when the cover is at the open position, the power of the fan will automatically turn off to save power without the need for additional software control. Furthermore, wireless power transmission is not used for the invention, such that the problems of reliability in power supplies will not be caused.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as first connection port, second connection port, first connection electrode, second connection electrode, first contact electrode, second contact electrode, first sub-cover, second sub-cover, first vent and second vent are only used for distinguishing various elements and do not limit the number of the elements.

What is claimed is:

1. A platform, adapted to accommodate a UAV (Unmanned Aerial Vehicle), comprising:
   a base, comprising a first connection port and a power source, the power source being coupled to the first connection port, and the first connection port comprising a first connection electrode and a second connection electrode; and
   a cover, comprising at least one fan and a second connection port corresponding to the first connection port of the base, the at least one fan being coupled to the second connection port, and the second connection port comprising a first contact electrode and a second contact electrode,
   wherein the cover is connected to the base and moves between an open position and a closed position relative to the base, and wherein the first connection port is connected to the second connection port when the cover is at the closed position, the first connection electrode is electrically connected to the first contact electrode, the second connection electrode is electrically connected to the second contact electrode, and the power source provides power to the at least one fan, and wherein the first connection port is not connected to the second connection port when the cover is at the open position.

2. The platform according to claim 1, wherein the cover further comprises a first vent and a second vent.

3. The platform according to claim 2, wherein the cover comprises a first sub-cover and a second sub-cover, and the first sub-cover and the second sub-cover are moving in opposite directions when the cover is moving between the open position and the closed position.

4. The platform according to claim 3, wherein the first vent is disposed on the first sub-cover, and the second vent is disposed on the second sub-cover.

5. The platform according to claim 3, wherein the first vent is disposed on the first sub-cover, the second vent is disposed on the second sub-cover, one of the at least one fan is disposed on the first vent, and another one of the at least one fan is disposed on the second vent.

6. The platform according to claim 1, wherein the base further comprises a controller and a temperature sensor, the controller is coupled to the first connection port and the temperature sensor, and when the cover is at the closed position and the temperature sensor detects a temperature greater than a preset value, the controller activates the at least one fan.

7. The platform according to claim 1, wherein the base further comprises a controller and the cover further comprises a temperature sensor, the controller is coupled to the first connection port, when the cover is at the closed position, the controller is coupled to the temperature sensor, and when the temperature sensor detects a temperature greater than a preset value, the controller activates the at least one fan.

8. The platform according to claim 1, wherein the base further comprises a controller, comprising a timing unit, the controller is coupled to the first connection port, and when the cover is at the closed position, the controller activates or deactivates the at least one fan according to preset time value of the timing unit.

9. The platform according to claim 1, wherein the base further comprises a driving device for driving the cover to move between the open position and the closed position.

10. The platform according to claim 1, wherein one of the first connection electrode and the first contact electrode is a pogo pin, and one of the second connection electrode and the second contact electrode is a pogo pin.

11. The platform according to claim 1, wherein one of the first connection electrode and the first contact electrode is a piece of spring, and one of the second connection electrode and the second contact electrode is a piece of spring.

12. The platform according to claim 1, wherein the base further comprises a charging port coupled to the power source, and the charging port is adapted to electrically connect the UAV and charge the UAV.

* * * * *